United States Patent Office 2,960,543
Patented Nov. 15, 1960

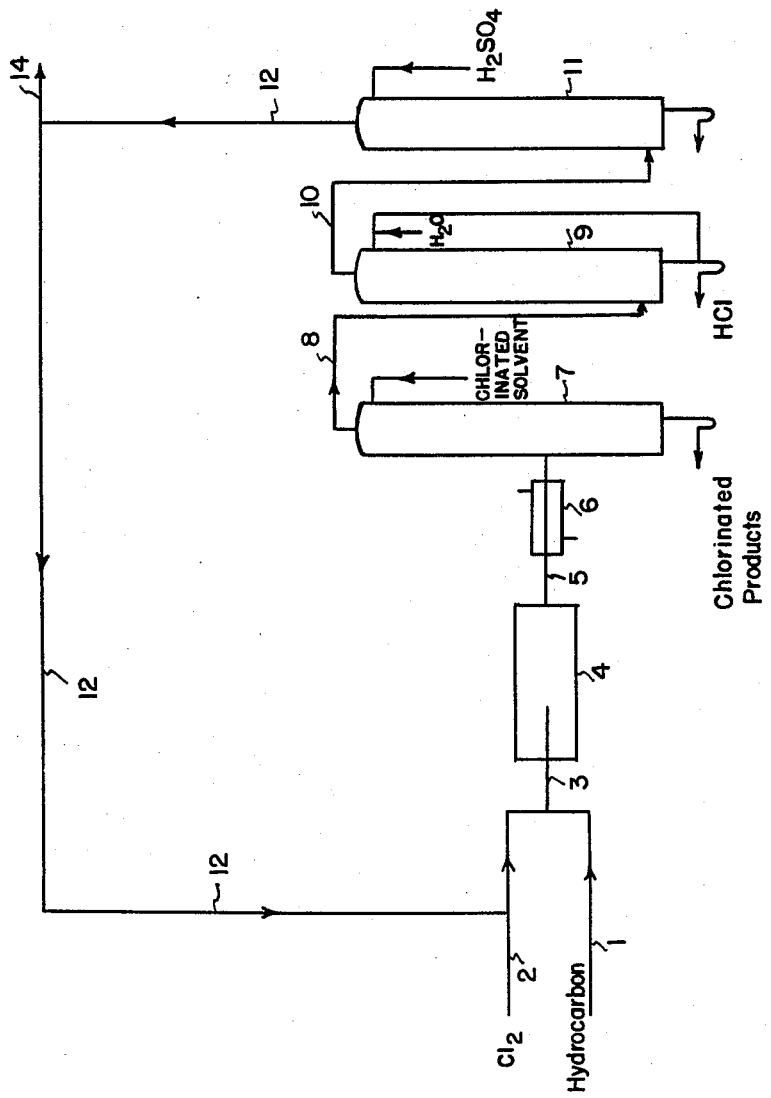

2,960,543

TOTAL CHLORINATION OF $C_4$ AND HIGHER ALIPHATIC HYDROCARBONS

John T. Patton and Donald E. Trucker, Wyandotte, Mich., assignors to Wyandotte Chemicals Corporation, Wyandotte, Mich., a corporation of Michigan Filed Sept. 28, 1953, Ser. No. 382,712

9 Claims. (Cl. 260—655)

This invention relates to the total chlorination of aliphatic hydrocarbons containing at least four carbon atoms in their structure and their partially chlorinated derivatives.

There are two principal types of vapor phase hydrocarbon chlorination processes, the so-called addition type chlorination and the substitution type chlorination. In the addition type reaction, chlorine is added to the hydrocarbon across an ethylenic or acetylenic bond. Such chlorinations can be carried out in a smooth, easily-controlled reaction and are widely used commercially.

In the substitution type chlorination, a chlorine atom is substituted for a hydrogen atom with the concomitant formation of hydrogen chloride. Chlorine may be substituted for one or more hydrogen atoms to give a series of products, a few of which are illustrated below when the starting hydrocarbon is butane:

(1) $C_4H_{10}+Cl_2 \rightarrow C_4H_9Cl+HCl$
(2) $C_4H_{10}+2Cl_2 \rightarrow C_4H_8Cl_2+2HCl$
(3) $C_4H_{10}+3Cl_2 \rightarrow C_4H_7Cl_3+3HCl$
(4) $C_4H_{10}+4Cl_2 \rightarrow C_4H_6Cl_4+4HCl$

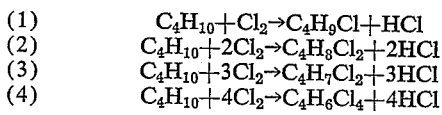

While the chemical nature of such substitution reactions is well understood, such reactions are highly exothermic and difficult to carry out in the vapor phase, especially when the hydrocarbon is totally chlorinated.

According to accepted chemical theory, the vapor phase substitution type chlorination of hydrocarbons is effected through a chain mechanism. In the first step a chlorine molecule is excited and disassociates to form a reactive chlorine atom. The excited chlorine atom reacts with the hydrocarbon to yield hydrogen chloride and a hydrocarbon free radical. The hydrocarbon free radical then reacts with undisassociated chlorine to form an alkyl chloride and an excited chlorine atom. Once started, the reaction is self-perpetuating and continues until a radical is deactivated. This type of mechanism is illustrated below where the hydrocarbon is butane:

(5) $C_4H_{10}+Cl\cdot \rightarrow C_4H_9\cdot + HCl$
(6) $C_4H_9\cdot + Cl_2 \rightarrow C_4H_9Cl + Cl\cdot$

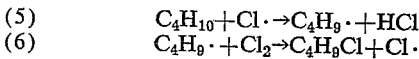

When Equations 5 and 6 are added, Equation 1 is obtained. Chlorine atoms may react with any of the hydrogen atoms of the hydrocarbon to give one or all of the products illustrated in Equations 1, 2, 3 and 4.

Chlorine atoms may be formed by exciting chlorine molecules with either ultraviolet light or heat. Thus, substitution chlorination reactions are broken down into two broad classes; (1) photochemical processes and (2) thermal processes. The photochemical processes are normally carried out in glass or quartz equipment under irradiation from mercury arc lamps. Such processes are unattractive because of the high equipment and operating costs.

In the thermal processes, the chain reaction is initiated by heating a mixture of the hydrocarbon and chlorine to 250°–300° C. The reaction is highly exothermic and, once started, the temperature of the reactants rises rapidly. The increase in temperature, of course, causes the formation of additional reactive chlorine atoms, which in turn increase the reaction rate and accelerate the rise in temperature. Unless special precautions are taken, the reaction proceeds at an uncontrollable rate, which is evidenced by explosions and the formation of carbon. Although the partially chlorinated $C_4$ and higher hydrocarbons, e.g. mono- and dichloro butanes and pentanes, can be readily prepared by employing large molar excesses of the hydrocarbon as internal coolants, no efficient process has been heretofore available for totally chlorinating $C_4$ and higher hydrocarbons in the vapor phase. The practical difficulty of carrying out such reactions in the vapor phase is illustrated by the many cumbersome methods which have been previously proposed in the art.

U.S. Patent 2,429,963 discloses a step-wise process for chlorinating methane to carbon tetrachloride. In the first step, a large molar excess of methane is mixed with chlorine and the mixed gas is heated to form a mixture of methane, methyl chloride, methylene chloride, etc. Subsequently, more chlorine is added to the reaction mixture and chlorination is continued. Additional chlorine is added in subsequent steps until the desired carbon tetrachloride is finally formed. The process is carried out in a compartmentized reactor.

Another step-wise chlorination procedure is illustrated by U.S. Patent 2,004,072. According to this process, the hydrocarbon that is to be chlorinated is passed through a long tube and chlorine is injected into the hydrocarbon streams through a series of jets which are spaced throughout the length of the reactor. The chlorine is injected into the hydrocarbon stream at a high velocity so as to obtain a rapid and intimate mixing of the two gases. The net effect of the process is that at any given point in the reactor there is an excess of either the hydrocarbon or a partially chlorinated hydrocarbon which acts as a diluent and internal coolant.

The fundamental principle upon which U.S. 2,004,072 and U.S. 2,429,963 operate is that an excess of either the hydrocarbon or a partially chlorinated hydrocarbon is present at the site of reaction and serves as an internal coolant. Numerous other processes have been disclosed which operate upon this principle. For example, U.S. 2,442,324 discloses a process in which either carbon tetrachloride or perchloroethylene is admixed with the chlorine and hydrocarbon before they enter the reaction zone. P.B. report 25,615, FIAT Reel 170, discloses a modification of the usual process in that the coolant, e.g. a highly chlorinated hydrocarbon or water, is injected directly into the reaction zone after the reaction has been started.

In Example 1 of U.S. 2,105,733 carbon tetrachloride was obtained by saturating methane with carbon tetrachloride vapor and reacting the mixed gas with chlorine under superatmospheric pressure. U.S. 2,170,801 discloses a process for obtaining carbon tetrachloride by chlorinating methane in elongated graphite channels in which the surfaces of the channel are less than $\frac{1}{32}$ of an inch apart. U.S. 2,280,928 discloses a vapor phase chlorination process which is carried out in a fluidized bed which absorbs the heat of the reaction.

From the foregoing discussion, it is apparent that all of the prior art vapor phase processes for the total chlorination of aliphatic hydrocarbons have serious shortcomings in that they require the use of diluents and/or cumbersome equipment.

Accordingly, it is an object of this invention to provide an efficient vapor phase process for the total chlorination of aliphatic hydrocarbons containing at least 4 carbon atoms in their structure and their partially chlorinated derivatives in which the temperature of the reaction is easily controlled and in which free carbon is not formed.

Other objects and advantages of the present invention will be apparent from the following detailed description thereof when read in conjunction with the attached drawing which is a flow sheet representing a preferred embodiment of the invention.

It has been discovered that aliphatic hydrocarbons containing at least 4 carbon atoms in their structure and their partially chlorinated derivatives can be totally chlorinated to yield a wide variety of valuable products, including totally chlorinated conjugated diolefins, by mixing, below reaction temperature, at least a stoichiometric quantity of chlorine with the hydrocarbon and burning the mixture of the two gases at an orifice. When the process is carried out as indicated, the chlorination reaction proceeds smoothly to yield predominantly totally chlorinated conjugated diolefins and hexachlorobenzene, although substantial quantities of carbon tetrachloride and perchloroethylene are also obtained. Essentially no free carbon is formed in the reaction and it is not necessary to use either internal or external coolants. That the described method yields valuable chlorinated hydrocarbons with no formation of carbon is a surprising and totally unexpected result, since U.S. 2,280,928 unequivocally states at column 1, lines 15–20 that finely divided carbon is obtained rather than valuable chlorinated hydrocarbons when a vapor phase chlorination reaction proceeds with the formation of a flame. Indeed, U.S. 2,403,735 discloses a process of burning gaseous hydrocarbons to obtain only finely divided carbon and hydrogen chloride.

The critical feature which distinguishes the present process from those previously known is the manner in which the mixture of chlorine and hydrocarbon is heated to reaction temperature. In all of the previously described processes, the chlorine and hydrocarbon were mixed and passed through a heated tube. When prior workers carried out the process in this manner, explosions and/or free carbon were inevitably obtained. We have repeated this work with methane and our results confirm those previously reported. According to the present invention, however, the mixture of chlorine and hydrocarbon is fed through an orifice into a burning flame where substantially all of the reaction takes place. Although all previous information on this reaction would indicate that only free carbon would be obtained in this manner, in fact no carbon is formed and valuable, totally chlorinated hydrocarbons are obtained in quantitative yields. At present the applicant has no theory to explain why free carbon is not formed in the described process.

The present process may be carried out by simply burning the mixture of chlorine and hydrocarbon in a hood operating under reduced pressure, in which case the totally chlorinated hydrocarbon products, hydrogen chloride and air are drawn into a product collection system. It is preferred, however, to operate in a completely closed system in which the orifice burner is placed in a horizontal or vertical tube which communicates with a product collection system. When the process is carried out in an apparatus of this type, it is preferred that the internal diameter of the tube be several times larger than the diameter of the orifice burner.

The mol ratio of chlorine to hydrocarbon must be at least equal to that stoichiometrically required to obtain totally chlorinated hydrocarbons. As used herein, the term "totally chlorinated hydrocarbons" designates a compound containing only carbon and chlorine atoms. The precise mol quantity of chlorine required for stoichiometric reaction will depend both upon the hydrocarbon that is to be chlorinated and the totally chlorinated hydrocarbon that is produced. To illustrate the effect that the totally chlorinated hydrocarbon produced has upon the chlorine requirement of the reaction, all of the following reactions take place to a measurable extent in the chlorination of butane:

(7) $C_4H_{10} + 13Cl_2 \rightarrow 4CCl_4 + 10HCl$ (8) $C_4H_{10} + 9Cl_2 \rightarrow 2C_2Cl_4 + 10HCl$ (9) $C_4H_{10} + 11Cl_2 \rightarrow 2C_2Cl_6 + 10HCl$

(10) $C_4H_{10} + 8Cl_2 \rightarrow C_4Cl_6 + 10HCl$

(11) $C_4H_{10} + 7Cl_2 \rightarrow \tfrac{2}{3}C_6Cl_6 + 10HCl$

In examining the above equations, it will be seen that the stoichiometric chlorine/butane ratio will vary from 7/1 when hexachlorobenzene is the product to 13/1 when carbon tetrachloride is the product. In all cases, however, a mixture of products is obtained and the actual stoichiometric ratio will lie intermediately between the maximum and minimum values set forth immediately above. In the case of butane, we have found that a chlorine/hydrocarbon mol ratio of about 10/1 is a practical lower limit.

Obviously, the chlorine/hydrocarbon mol ratio required for stoichiometric reaction will depend upon the number of carbon atoms contained in the hydrocarbon. For convenience in comparing chlorine/hydrocarbon ratios and reducing them to a comparable basis, reference will be made to a chlorine/carbon atom ratio. This ratio is established by dividing the chlorine/hydrocarbon ratio by the number of carbon atoms in the hydrocarbon that is being chlorinated. Thus, a chlorine/butane ratio or 10/1 may be expressed as a chlorine/carbon atom ratio of 2.5. As noted in the paragraph above, the practical minimum chlorine/hydrocarbon ratio in chlorinating butane is 10/1. Since butane is typical of the hydrocarbons that are operable in the described process, a chlorine/carbon atom ratio of 2.5/1 may be considered as a practical lower operating limit in the process, although in some cases a somewhat lower limit may be employed. In many cases, a susbtantial excess of chlorine over the minimum chlorine/carbon atom ratio of 2.5/1 will be employed, since the chlorine/carbon atom ratio has an important effect on the distribution of chlorinated products that is obtained, as will be subsequently discussed. In particular, where it is desired to obtain high yields of perchlorinated conjugated diolefins chlorine/carbon atoms ratios of at least 4.0/1 or preferably 4.5 or even higher should be employed.

The process is most efficient when operated on a continuous and uninterrupted basis. In this regard, it is important to maintain an even burning flame that will not be extinguished by minor variations in the inlet gas pressure and/or chlorine/carbon atom ratio. The combustion characteristics of the flame are influenced principally by the chlorine/carbon atom ratio, the feed rate of the chlorine-hydrocarbon gas mixture and the burner design.

The chlorine/carbon atom ratio must be maintained within prescribed, although relative broad, limits. As previously noted, the practical minimum chlorine/carbon atom ratio that may be employed is 2.5/1 and a steady even burning flame is obtained at this ratio. As the chlorine/carbon atom ratio is increased, the excess chlorine acts as a diluent which lowers the flame temperature and eventually the mixture becomes deficient in hydrocarbon and will no longer support combustion. It is impossible to ascertain the precise upper limit on the chlorine/carbon atom ratio that will be operable in the process, since the limiting ratio is importantly affected by other operating variables in the system such as the hydrocarbon being chlorinated, the feed rate of the chlorine-hydrocarbon mixture, the burner design, etc. In any event, the determination of the precise upper limit on the chlorine/carbon atom ratio under any given set of operating conditions does not constitute a critical feature of the invention, since it can be readily determined by routine experimentation. To illustrate the ratios that may be used, butane and pentane have been successfully chlorinated at chlorine/carbon atom ratios as high as 4:3/1. From an operational viewpoint there appears to be little advantage in operating at ratios appreciably higher than 4.5/1. As previously noted, however, high chlorine/carbon atom ratios favor the formation of perchlorinated conjugated diolefins and when these are the desired products it may be advantageous to operate at ratios as high 5.0/1 or even higher.

The feed rate of the chlorine/hydrocarbon mixture may be varied within wide limits which are determined by a number of empirical factors such as the hydrocarbon being chlorinated, the chlorine/carbon atom ratio and the burner design. Generally, the feed rate must be fast enough to support the flame and prevent flash back, and slow enough so that the flame will not be blown out.

The design of the burner is not critical and excellent results have been obtained by simply burning the chlorine/hydrocarbon mixture at the end of a glass or metal tube. In general, any orifice burner that is efficient in burning a hydrocarbon with air or oxygen will give good results in the process in the present invention. The selection of any particular burner is based upon both empirical observation and burner design calculations which are well known in the art, and the selection of any particular burner does not constitute a critical feature of the present invention.

The principal products of the process are perchlorinated diolefins, e.g. perchlorobutadiene and perchlorocyclopentadiene, hexachlorobenzene, carbon tetrachloride, perchloroethylene, hexachloroethane, etc. The relative proportions of chlorinated products formed is dependent upon a number of variables including the flame temperature and the chlorine/carbon atom ratio. The process is flexible and can be adjusted to yield the desired products in a wide variety of ratios.

The following examples are set forth to more clearly illustrate the principle and practice of the invention to those skilled in the art.

*Example 1*

Butane was chlorinated in an apparatus that consisted of a glass orifice burner positioned in the center of a horizontal Pyrex tube of 2" I.D. which discharged into a vertical water scrubber. The orifice burner was a section of 8 mm. I.D. glass tubing that was sealed to a 29/42 standard-taper, ground glass joint.

In operation, chlorine and butane were mixed and introduced into the orifice burner at a mol ratio of 17.2/1 and ignited to produce a flame. Details as to the composition of the feed gas and the distribution of the products collected are shown in Table I below:

TABLE I

| | |
|---|---|
| Reaction time, minutes | 93 |
| Mols $C_4H_{10}$ fed | 0.671 |
| Mols $Cl_2$ fed | 11.5 |
| $Cl_2/C_4H_{10}$ mol ratio | 17.2/1 |
| $Cl_2/C$ atom mol ratio | 4.3/1 |
| Weight chlorinated products, grams | 174 |
| Product composition: | |
|    Carbon tetrachloride | 6 |
|    Perchloroethylene | 16 |
|    Hexachloroethane | 8 |
|    Hexachlorobutadiene | 69 |
|    Hexachlorobenzene | 1 |

*Example 2*

Pentane was chlorinated in a manner analogous to that described in Example 1. Details as to the composition of the feed gas and the chlorinated hydrocarbon products obtained are summarized in Table II:

TABLE II

| | |
|---|---|
| Reaction time, minutes | 54 |
| Mols $C_5H_{12}$ fed | 1.22 |
| Mols $Cl_2$ fed | 26.0 |
| $Cl_2/C_5H_{12}$ mol ratio | 21.3/1 |
| $Cl_2/C$ atom mol ratio | 4.27/1 |
| Weight chlorinated products, grams | 234 |
| Product composition: | |
|    Carbon tetrachloride | trace |
|    Perchloroethylene | 12.4 |
|    Hexachloroethane | trace |
|    Hexachlorobutadiene | 7.7 |
|    Hexachlorocyclopentadiene | 44.6 |
|    Hexachlorobenzene | 35.3 |

*Example 3*

The distribution of chlorinated hydrocarbons that is obtained is affected by the chlorine/hydrocarbon mol ratio that is employed. To illustrate this effect, butane was chlorinated in the apparatus described in Example 1 over a wide range of chlorine/butane ratios. The results are illustrated in Table III:

TABLE III

| Run No | 1 | 2 | 3 |
|---|---|---|---|
| Reaction Time, Minutes | 53 | 17 | 93 |
| Mols $C_4H_{10}$ fed | 0.521 | 0.169 | 0.671 |
| Mols $Cl_2$ fed | 6.0 | 2.55 | 11.5 |
| $Cl_2/C_4H_{10}$ Mol Ratio | 11.5/1 | 15.1/1 | 17.2/1 |
| $Cl_2/C$ atom Mol Ratio | 2.89 | 3.78 | 4.30 |
| Weight Chlorinated Products, grams: | | | |
|   Product Composition— | | | |
|     Carbon Tetrachloride | 0 | 6 | 6 |
|     Perchloroethylene | 8 | 10 | 16 |
|     Hexachloroethane | 12 | 4 | 8 |
|     Hexachlorobutadiene | 27 | 58 | 69 |
|     Hexachlorobenzene | 53 | 22 | 1 |

The above data illustrate the inherent flexibility of the process and demonstrate that it is possible to vary the proportions of the chlorinated hydrocarbons in the product by simply varying the mol ratio of chlorine to hydrocarbon. It is to be particularly noted that high chlorine/carbon atom ratios favor the formation of hexachlorobutadiene.

A preferred mode of operation for carrying out the described process on a commercial scale is illustrated diagrammatically in the figure. The hydrocarbon feed is introduced into line 3 through line 1 together with chlorine from line 2. The mixture of chlorine and hydrocarbon passes through line 3 into reactor 4 and is burned at the discharge orifice of line 3. The chlorinated products together with any excess chlorine pass through line 5 and are partially cooled by heat exchanger 6 before entering product absorption column 7, wherein the chlorinated products are absorbed by a chlorinated solvent such as carbon tetrachloride or perchloroethylene. The discharge from column 7 is then distilled to separate the reaction products from the absorbing solvent in columns not shown in the figure.

The remaining gaseous mixture of hydrogen chloride and chlorine is fed through line 8 into a water scrubber 9 wherein the hydrogen chloride is absorbed to form aqueous hydrochloric acid which is withdrawn from the bottom. The chlorine passes from the water scrubber through line 10 to a sulfuric acid dryer 11 which removes moisture from the chlorine. The dry chlorine gas is recycled through line 12 to the chlorine inlet line 2. Vent line 14 is provided to permit venting from time to time to remove inert gases such as nitrogen which accumulate in the system.

While the examples show the chlorination of butane and pentane, comparable results are obtained when the hydrocarbon chlorinated is a higher aliphatic hydrocarbon or a partially chlorinated derivative of a hydrocarbon such as butylchloride, dichloropentane, butylene dichloride, etc.

What is claimed is:

1. A continuous process for the total chlorination of a saturated aliphatic hydrocarbon having at least 4 carbon atoms, which comprises forming a gaseous mixture of chlorine and said hydrocarbon, the chlorine being present in at least the stoichiometric quantity required to totally chlorinate said compound, passing said mixture through an orifice and subjecting the effluent therefrom to flame ignition.

2. A continuous process for the total chlorination of a saturated aliphatic hydrocarbon having at least 4 carbon atoms, which comprises forming a gaseous mixture of chlorine and said hydrocarbon, the chlorine being present in at least the stoichiometric quantity required to totally chlorinate said compound, passing said mixture through an orifice into a reaction zone and energizing the effluent from said orifice so as to form a flame.

3. A continuous process for the total chlorination of a saturated aliphatic hydrocarbon having at least 4 carbon atoms, which comprises forming a gaseous mixture of chlorine and said hydrocarbon, the chlorine being present in at least the stoichiometric quantity required to totally chlorinate said compound, passing said mixture through an orifice and reacting the chlorine and said hydrocarbon at a rate sufficient to produce a flame at said orifice whereby totally chlorinated hydrocarbons are formed substantially free of elemental carbon.

4. A continuous process for the total chlorination of a saturated aliphatic hydrocarbon having at least 4 carbon atoms, which comprises forming a gaseous mixture of chlorine and said hydrocarbon, the chlorine being present in at least the stoichiometric quantity required to totally chlorinate said compound, passing said mixture through an orifice and subjecting the effluent from said orifice to flame ignition, regulating the flow of the gaseous mixture through the orifice so as to produce a stable flame and collecting totally chlorinated hydrocarbons substantially free of elemental carbon.

5. A process in accordance with claim 4 wherein the compound to be chlorinated is n-butane.

6. A process in accordance with claim 4 wherein the compound to be chlorinated is a saturated aliphatic hydrocarbon containing at least 5 carbon atoms.

7. A process in accordance with claim 4 wherein the compound to be chlorinated is n-pentane.

8. The process of preparing hexachlorobutadiene, which comprises forming a gaseous mixture of n-butane and chlorine, the chlorine being present in an amount sufficient to give a chlorine/carbon atom ratio of at least 4.0, passing said mixture through an orifice and subjecting the effluent from said orifice to flame ignition.

9. The process of preparing hexachlorocyclopentadiene, which comprises forming a gaseous mixture of n-pentane and chlorine, the chlorine being present in an amount sufficient to five a chlorine/carbon atom ratio of at least 4.0, passing said mixture through an orifice and subjecting the effluent from said orifice to flame ignition.

References Cited in the file of this patent

UNITED STATES PATENTS

| | | |
|---|---|---|
| 2,454,820 | McBee et al. | Nov. 30, 1948 |
| 2,509,160 | McBee et al. | May 23, 1950 |
| 2,538,723 | Fruhwirth | Jan. 16, 1951 |

FOREIGN PATENTS

| | | |
|---|---|---|
| 879,785 | France | Nov. 30, 1942 |
| 734,722 | Germany | Apr. 22, 1943 |
| 736,884 | Germany | July 1, 1943 |

OTHER REFERENCES

Fruhwirth: "Ber. der Deut. chem. Gesell.," vol. 74, pages 1700–1701 (1941).

UNITED STATES PATENT OFFICE
CERTIFICATION OF CORRECTION

November 15, 1960

Patent No. 2,960,543

John T. Patton et al.

It is hereby certified that error appears in the above numbered patent requiring correction and that the said Letters Patent should read as corrected below.

Column 2, line 31, for "streams" read -- stream --; column 4, line 30, for "or" read -- of --; column 5, line 1, for "4:3/1" read -- 4.3/1 --; line 12, for "chloriated" read -- chlorinated --; column 8, line 19, for "five" read -- give --.

Signed and sealed this 2nd day of May 1961.

(SEAL)
Attest:

ERNEST W. SWIDER
Attesting Officer

DAVID L. LADD
Commissioner of Patents